US012645799B2

(12) United States Patent
Lancioni et al.

(10) Patent No.: US 12,645,799 B2
(45) Date of Patent: Jun. 2, 2026

(54) METHODS AND APPARATUS TO AUGMENT CLASSIFICATION COVERAGE FOR LOW PREVALENCE SAMPLES THROUGH NEIGHBORHOOD LABELS PROXIMITY VECTORS

(71) Applicant: McAfee, LLC, San Jose, CA (US)

(72) Inventors: German Lancioni, San Jose, CA (US); Jonathan King, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 72 days.

(21) Appl. No.: 18/897,632

(22) Filed: Sep. 26, 2024

(65) Prior Publication Data

US 2025/0013748 A1    Jan. 9, 2025

Related U.S. Application Data

(63) Continuation of application No. 17/566,760, filed on Dec. 31, 2021, now Pat. No. 12,141,282.

(60) Provisional application No. 63/227,305, filed on Jul. 29, 2021.

(51) Int. Cl.
*G06F 21/56* (2013.01)
*G06N 7/01* (2023.01)

(52) U.S. Cl.
CPC ............ *G06F 21/566* (2013.01); *G06F 21/56* (2013.01); *G06F 21/567* (2013.01); *G06N 7/01* (2023.01); *G06F 2221/033* (2013.01)

(58) Field of Classification Search
None
See application file for complete search history.

(56) References Cited

U.S. PATENT DOCUMENTS

| | | | |
|---|---|---|---|
| 8,621,626 B2 | 12/2013 | Alme | |
| 10,924,503 B1 | 2/2021 | Pereira et al. | |
| 10,970,650 B1 * | 4/2021 | Abusorrah | G06N 20/00 |
| 11,262,742 B2 * | 3/2022 | Srinivasamurthy | |
| | | | G05B 23/0281 |

(Continued)

FOREIGN PATENT DOCUMENTS

| | | | |
|---|---|---|---|
| CN | 110991538 | 4/2020 | |
| EP | 4446916 B1 * | 11/2025 | G06V 10/82 |

OTHER PUBLICATIONS

United States Patent and Trademark Office, "Non-Final Office Action," issued Mar. 12, 2024 in connection with U.S. Appl. No. 17/645,921, 22 pages.

(Continued)

*Primary Examiner* — Christopher B Robinson
(74) *Attorney, Agent, or Firm* — Hanley, Flight & Zimmerman, LLC

(57) ABSTRACT

Disclosed examples include obtaining malicious neighbor samples based on a non-classified sample; obtaining clean neighbor samples based on the non-classified sample; generating a malicious proximity vector representing first distances between the non-classified sample and a first malicious neighbor sample from the malicious neighbor samples; generating a clean proximity vector representing second distances between the non-classified sample and a first clean neighbor sample from the clean neighbor samples; and classifying the non-classified sample as a clean sample or a malicious sample based on at least one of the malicious proximity vector or the clean proximity vector.

20 Claims, 11 Drawing Sheets

(56) References Cited

U.S. PATENT DOCUMENTS

| | | | | |
|---|---|---|---|---|
| 11,676,069 | B2 * | 6/2023 | Hazard | G06N 20/00 |
| | | | | 706/12 |
| 11,880,775 | B1 * | 1/2024 | Hazard | G06N 5/04 |
| 2013/0326625 | A1 | 12/2013 | Anderson et al. | |
| 2016/0098561 | A1 | 4/2016 | Keller et al. | |
| 2016/0132521 | A1 | 5/2016 | Reininger et al. | |
| 2017/0126736 | A1 | 5/2017 | Urias et al. | |
| 2019/0026466 | A1 | 1/2019 | Krasser et al. | |
| 2019/0199736 | A1 | 6/2019 | Howard et al. | |
| 2020/0311262 | A1 * | 10/2020 | Nguyen | G06F 21/554 |
| 2020/0410091 | A1 * | 12/2020 | Kimon | G06F 21/554 |
| 2021/0295209 | A1 * | 9/2021 | Lancioni | G06N 3/088 |
| 2022/0172105 | A1 * | 6/2022 | Nia | G06N 5/045 |
| 2022/0318383 | A1 * | 10/2022 | Huang | G06N 3/08 |
| 2023/0029679 | A1 | 2/2023 | Lancioni et al. | |
| 2023/0030136 | A1 | 2/2023 | Lancioni et al. | |
| 2023/0032194 | A1 | 2/2023 | Lancioni et al. | |
| 2023/0171277 | A1 | 6/2023 | Giaconi et al. | |

OTHER PUBLICATIONS

United States Patent and Trademark Office, "Non-Final Office Action," issued Mar. 14, 2024 in connection with U.S. Appl. No. 17/561,475, 11 pages.

United States Patent and Trademark Office, "Notice of Allowance," issued Aug. 30, 2024 in connection with U.S. Appl. No. 17/561,475, 6 pages.

United States Patent and Trademark Office, "Non-Final Office Action," issued Dec. 7, 2023 in connection with U.S. Appl. No. 17/566,760, 11 pages.

United States Patent and Trademark Office, "Final Office Action," issued Apr. 29, 2024 in connection with U.S. Appl. No. 17/566,760, 11 pages.

United States Patent and Trademark Office, "Notice of Allowance," issued Jun. 11, 2024 in connection with U.S. Appl. No. 17/566,760, 11 pages.

United States Patent and Trademark Office, "Corrected Notice of Allowability," issued in connection with U.S. Appl. No. 17/566,760, dated Sep. 26, 2024, 9 pages.

United States Patent and Trademark Office, "Final Office Action," issued in connection with U.S. Appl. No. 17/645,921, mailed on Oct. 10, 2024, 21 pages.

Alaeiyan, et al., "A Multilabel Fuzzy Relevance Clustering System for Malware Attack Attribution in the Edge Layer of Cyber-Physical Networks," ACM Transactions on Cyber-Physical Systems, vol. 4, No. 3, 22 pages, Mar. 2020.

D'Elia, et al., "On the Dissection of Evasive Malware," IEEE Transactions on Information Forensics and Security, 15 pages, 2020.

United States Patent and Trademark Office, "Notice of Allowance and Fee(s) Due," issued in connection with U.S. Appl. No. 17/645,921, mailed Jun. 17, 2025, 10 pages.

United States Patent and Trademark Office, "Advisory Action," issued in connection with U.S. Appl. No. 17/645,921, dated Jan. 30, 2025, 3 pages.

United States Patent and Trademark Office, "Non-Final Office Action," issued in connection with U.S. Appl. No. 17/645,921, dated Feb. 12, 2025, 22 pages.

* cited by examiner

200

205B

205A

210

205C

300

305

TRADITIONAL FEATURE-BASED
CLASSIFIER

90% SAMPLES CLASSIFIED

REMAINING SAMPLES MISSED BECAUSE OF LOW
PREVALENCE IN THE TRAINING SET

310

APPENDIX (PROXIMITY & LABEL-BASED)
CLASSIFIER

10% OF REMAINING SAMPLES
CLASSIFIED

500A

| 502A | 504A | 506A |
|------|------|------|
| 1 | 1 | 0 |
| MALICIOUS | MALICIOUS | CLEAN |
| ... | ... | ... |

BASIC PROXIMITY VECTOR

| 502B TOP 1 SIMILAR ADVANCED SAMPLE | | | 504B TOP 2 SIMILAR ADVANCED SAMPLE | | | 506B TOP 3 SIMILAR ADVANCED SAMPLE | | | |
|---|---|---|---|---|---|---|---|---|---|
| HAMMING_1 | EUCLIDEAN_1 | TSR_1 | HAMMING_2 | EUCLIDEAN_2 | TSR_2 | HAMMING_3 | EUCLIDEAN_3 | TSR_3 | ... |
| 0.4 | 0.3 | 0.6 | 0.55 | 0.45 | 0.6 | 0.7 | 0.4 | 0.9 | ... |
| 514A | 516A | 518A | 514B | 516B | 518B | 514C | 516C | 518C | |

FIG. 5B

METHODS AND APPARATUS TO AUGMENT CLASSIFICATION COVERAGE FOR LOW PREVALENCE SAMPLES THROUGH NEIGHBORHOOD LABELS PROXIMITY VECTORS

RELATED APPLICATION

This patent arises from a continuation of U.S. patent application Ser. No. 17/566,760, which was filed on Dec. 31, 2021, which claims benefit of U.S. Provisional Patent Application Ser. No. 63/227,305, which was filed on Jul. 29, 2021. U.S. patent application Ser. No. 17/566,760 and U.S. Provisional Patent Application No. 63/227,305 are hereby incorporated herein by reference in their entireties. Priority to U.S. patent application Ser. No. 17/566,760 and U.S. Provisional Patent Application No. 63/227,305 is hereby claimed.

FIELD OF THE DISCLOSURE

This disclosure relates generally to malware classification and, more particularly, to methods and apparatus to augment classification coverage for low prevalence samples through neighborhood labels proximity vectors.

BACKGROUND

The introduction of malware into regular software has grown rapidly over the recent years. The ability to classify and categorize malware and benign software is an important function of security programs. When training a machine learning model to be able to distinguish between malicious and clean software, a differentiation between noise and low prevalence samples in the training data is important for ensuring ensure accuracy of sample classification by the machine learning model in deployment.

BRIEF DESCRIPTION OF THE DRAWINGS

FIGS. 5A and 5B depict example data sets that may be implemented by the appendix classifier circuitry of FIG. 1 to create a proximity vector.

The figures are not to scale. Instead, the thickness of the layers or regions may be enlarged in the drawings. In general, the same reference numbers will be used throughout the drawing(s) and accompanying written description to refer to the same or like parts.

Figure 1:
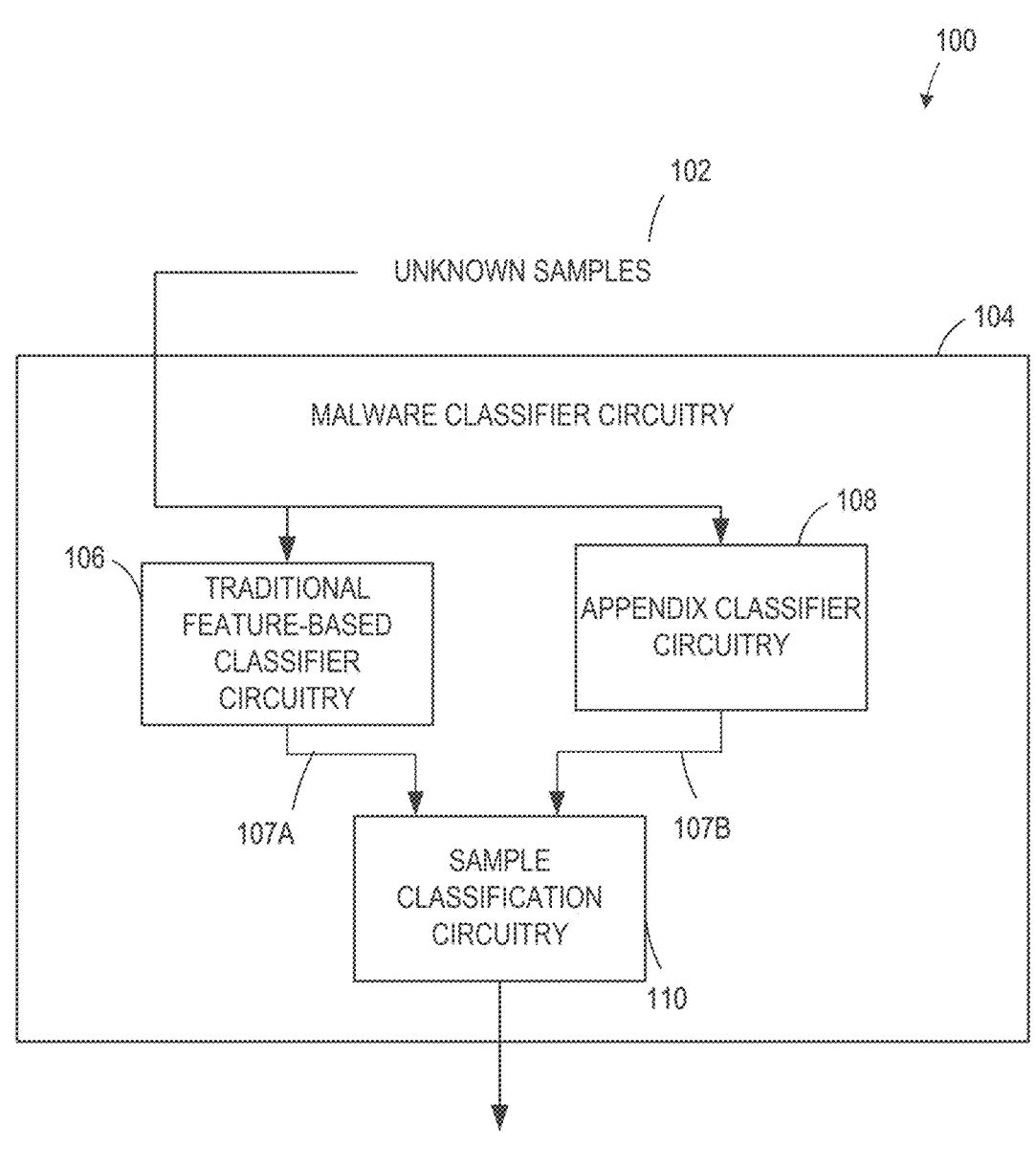
FIG. 1 is block diagram of an example system to classify samples as clean or malicious.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations when processing input data such that other input(s) result in output(s) consistent with the recognized patterns and/or associations.

Many different types of machine learning models and/or machine learning architectures exist. In some examples disclosed herein, a decision tree model is used. Using a decision tree model enables the interpretation of data that is simple and explainable. In general, machine learning models/architectures that are suitable to use in the example approaches disclosed herein will be Convolutional Neural Network (CNN) and/or Deep Neural Network (DNN), wherein interconnections are not visible outside of the model. However, other types of machine learning models could additionally or alternatively be used such as Recurrent Neural Network (RNN), Support Vector Machine (SVM), Gated Recurrent Unit (GRU), Long Short Term Memory (LSTM), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using known software samples (e.g., malicious and/or clean). However, any other training algorithm may additionally or alternatively be used. In examples disclosed herein, training is performed on the feature-based classification model and appendix classification model.

Training is performed using hyperparameters that control how the learning is performed (e.g., a learning rate, a number of layers to be used in the machine learning model, etc.).

Training is performed using training data. In examples disclosed herein, the training data may be any type of dataset of malicious and/or clean software samples.

Once training is complete, the model is deployed for use as an executable construct that processes an input and provides an output based on the network of nodes and connections defined in the model. The model is stored in a memory. The model may then be executed by the malware classifier circuitry 104 of FIG. 1.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

One example algorithm for machine learning classification is decision tree-based classification. Decision trees are created in such a way, using decision tree-based classifiers (e.g., feature-based machine learning classifiers), such that a minimum number of similar observations is required to influence the nodes and leaves of the tree. When the minimum number of similar observations is not satisfied, the feature-based ML classifier will disregard any training data that is deemed to be too far from the sample average (i.e., noise), as a control mechanism to prevent overfitting and/or underfitting of data by the resulting machine learning model in deployment.

However, an inability to distinguish between noise and low prevalence samples in the training data often results in the omission of important low prevalence data samples when building a machine learning model with which software classification will be performed. As a result, the model will not generalize well in deployment when given unknown data samples similar to the disregarded low prevalence samples to be classified as malicious or clean. For example, in a corpus of nine million malware samples, a set of 50 unique observations may not be a sufficiently large sample to be included in the training set, which introduces an everlasting gap in detectability that cannot be mitigated unless more samples of the same kind are added to the training set, which is not often possible.

Essentially, malware samples that have low representation or variations in the wild will be able to evade decision-tree based classifiers by flying "under the radar." This can create a 'gap' in detectability, wherein the quantity of samples may be large enough that they are not easily detected with signature methods but still small enough to evade ML based methods.

Example methods and apparatus disclosed herein receive unknown data samples for classification, classify the data sample using a feature-based classifier, classify the data sample again using a second appendix classifier, and output a final classification based on a confidence threshold. Having the ability to compute a second appendix classifier without a control mechanism against low prevalence samples allows for the more accurate building of a machine learning model for future classification of software samples. Examples disclosed herein utilize distance metrics such as Euclidean distance, Hamming distance, Levenshtein and/or string token distance, etc., as well as data manipulation methods such as MinHash, Locality Sensitive Hashing (LSH), etc. and feature-based machine learning classifiers such as decision tree-based classifiers, etc.

FIG. 1 is a block diagram of an example implementation of a malware classification system 100, implemented in accordance with the teachings of the present disclosure. The example malware classification system 100 of FIG. 1 includes example malware classifier circuitry 104 that accepts unclassified samples 102 and outputs classified samples 112. The example malware classifier circuitry 104 includes a feature-based classifier circuitry 106, appendix classifier circuitry 108, and sample classification circuitry 110.

In the example malware classification system 100 of FIG. 1, the unclassified samples 102 are portable executable (PE) files that have yet to be categorized as clean or malicious. A PE file is the native format of executable binaries (DLLs, drivers and programs) for the Microsoft Windows® operating systems. However, other operating systems may additionally or alternatively be used to execute PE files. PE file types may include but are not limited to: EXE, DLL, SYS, MSSTYLES, OCX, SCR and more. While examples disclosed herein are discussed in the context of the unclassified samples 102 being PE files, in some examples, the unclassified samples 102 may represent any type of file that has yet to be classified as clean or malicious.

The example malware classifier circuitry 104 accepts the unclassified samples 102 and produces the classified samples 112. In examples disclosed herein, the classified samples 112 are PE files that have been classified as clean or malicious. In some examples, the classified samples 112 may represent any type of file that has been classified as clean or malicious. The example malware classifier circuitry 104 includes example feature-based classifier circuitry 106, example appendix classifier circuitry 108, and example sample classification circuitry 110.

The example feature-based classifier circuitry 106 accepts the unclassified samples 102 and produces first intermediate classified samples 107A to be processed further in the example sample classification circuitry 110. In examples disclosed herein, the feature-based classifier circuitry 106 is a decision-tree based classifier that has a set of diverse features defined as a "feature vector" containing categorical and/or numerical values.

In some examples, the malware classifier circuitry 104 of FIG. 1 includes means for determining a feature-based classification result for the unknown data sample. For example, the means for determining a feature-based classification result for the unknown data sample may be implemented by feature-based classifier circuitry 106. In some examples, the feature-based classifier circuitry 106 may be implemented by machine executable instructions such as that implemented by at least blocks 602, 604 of FIG. 6 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the feature-based classifier circuitry 106 is implemented by other hardware logic circuitry, hardware implemented state machines, and/or any other combination of hardware, software, and/or firmware. For example, the feature-based classifier circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example appendix classifier circuitry 108 employs a two-stage refinement and classification process based on the labels of similar samples, to produce a feature-agnostic classification based on the reputation of the Jaccard-neighborhood as second intermediate classified samples 107B. This translates into a different perspective of analysis, complementing the feature-based classifier. Because the mechanism is based on similarity discovery through a MinHash LSH Forest, it is agnostic and insensitive to dataset sample prevalence, thus allowing for the production of non-overlapping results with only a few neighbor samples. The example appendix classifier circuitry 108 is described further in conjunction with FIG. 4.

In some examples, the malware classifier circuitry 104 of FIG. 1 includes means for determining an appendix classification result for the unknown data sample. For example, the means for determining an appendix classification result for the unknown data sample may be implemented by the appendix classifier circuitry 108. In some examples, the appendix classifier circuitry 108 may be implemented by machine executable instructions such as that implemented by at least block 606 of FIG. 6 and/or blocks 702-714 of FIG. 7 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the appendix classifier circuitry 108 is implemented by other hardware logic circuitry, hardware implemented state machines, and/or any other combination of hardware, software, and/or firmware. For example, the appendix classifier circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 6:
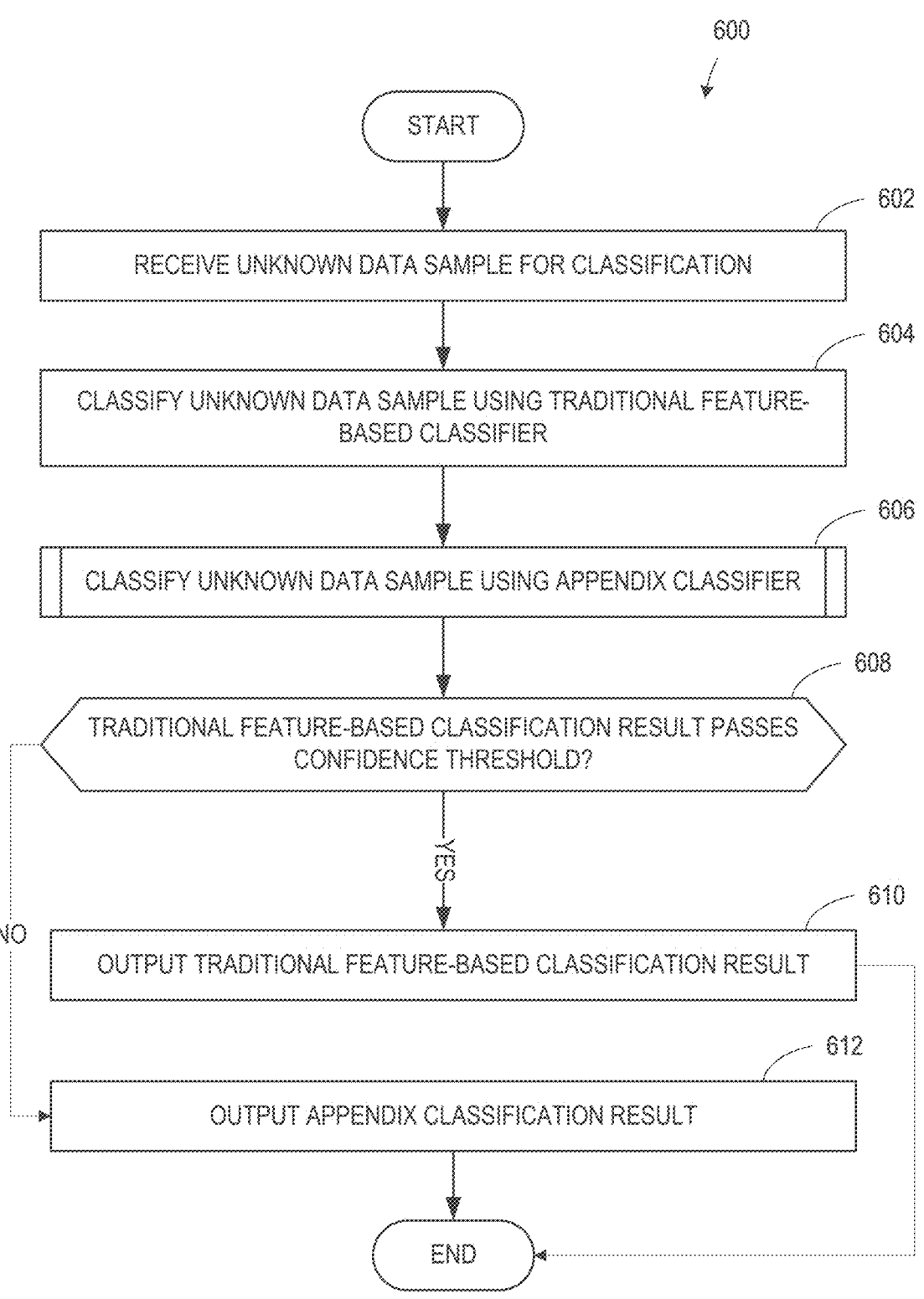
FIGS. 6 and 7 are flowcharts representative of example machine readable instructions that may be executed by example processor circuitry to implement the example malware classification system of FIGS. 1 and/or 4, in accordance with the teachings of this disclosure.

The example sample classification circuitry 110 of FIG. 1 accepts first and second intermediate classified samples, 107A and 107B, and produces the classified samples 112 based on a confidence threshold (the confidence threshold is further described in conjunction with FIG. 6). In examples disclosed herein, the first intermediate classified samples 107A used as input to the example sample classification circuitry 110 are produced using any technique that classifies portable executable files as clean or malicious (e.g., decision tree-based classification).

Figure 2:
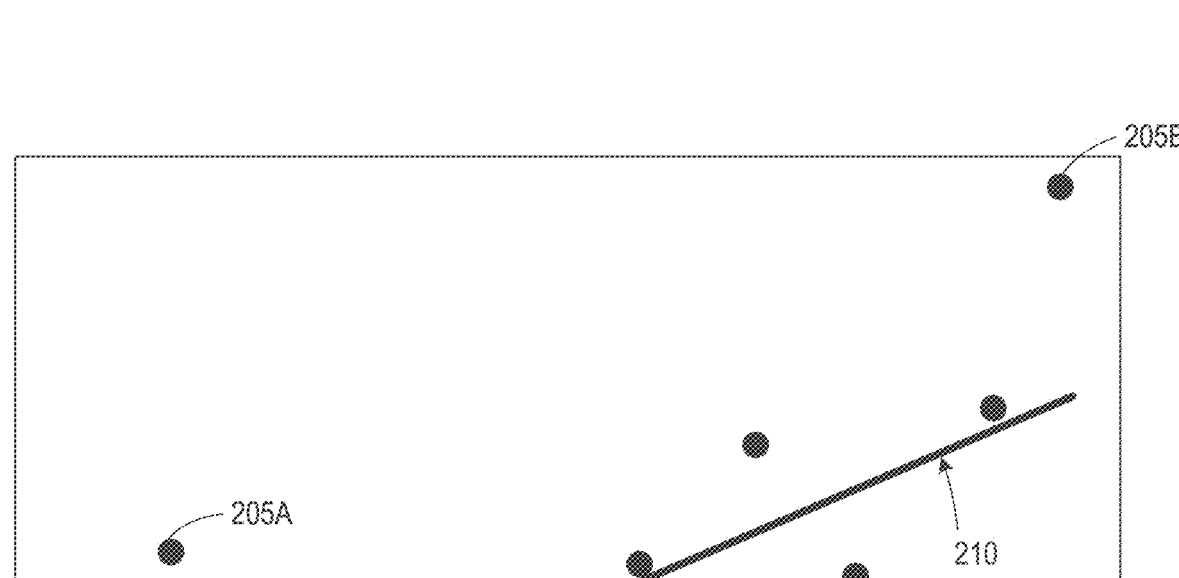
FIG. 2 is an example depiction of a set of training data for the machine learning model.

FIG. 2 is an example depiction of a set of training data for the machine learning model. The example dataset 200 illustrates an average 210 of the data points. Example data points 205A, 205B, and 205C represent data samples that, in examples disclosed herein, are positioned far enough away from the average 210 to be deemed noise and thus omitted from training when feature-based machine learning classifiers are used.

Figure 3:
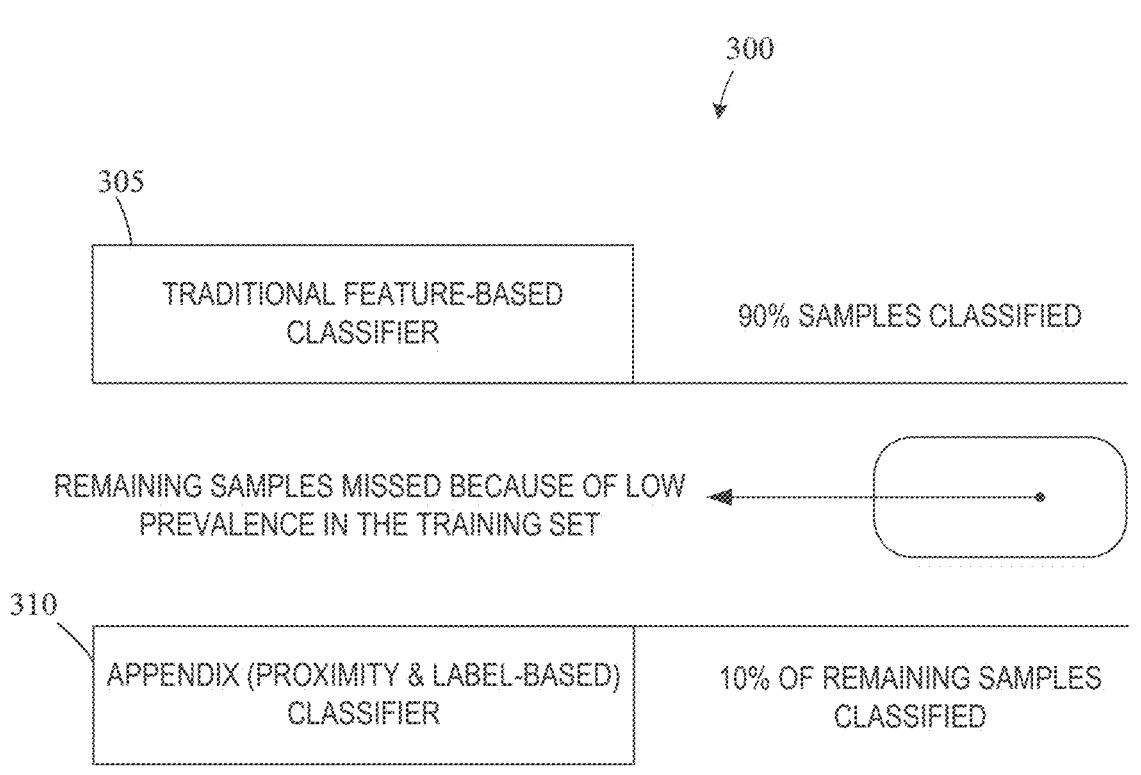
FIG. 3 is a block diagram of an example classification pipeline that illustrates which samples are identified by the appendix classifier circuitry of FIG. 1.

FIG. 3 is a block diagram of an example classification pipeline that illustrates which samples are identified by the appendix classifier circuitry of FIG. 1. The example classification pipeline 300 includes an example feature-based classifier 305 and an example appendix classifier 310.

Because an LSH Forest queries similar samples based on Jaccard-distance, it can retrieve a similar sample independent of its prevalence. For example, if only 5 out of 10 million samples present the same characteristics, the LSH Forest is still capable of retrieving these 5 low-prevalence samples if the MinHash result of the unknown sample proves to be similar. This then gives the low prevalence samples the same chance of influencing the second-stage appendix classifier as high-prevalence samples. Therefore, while the feature-based classifier 305 is capable of classifying 90% of the unclassified samples, the example appendix classifier 310 can identify the remaining 10% of low-prevalence samples, effectively closing the aforementioned gap in detectability.

Figure 4:
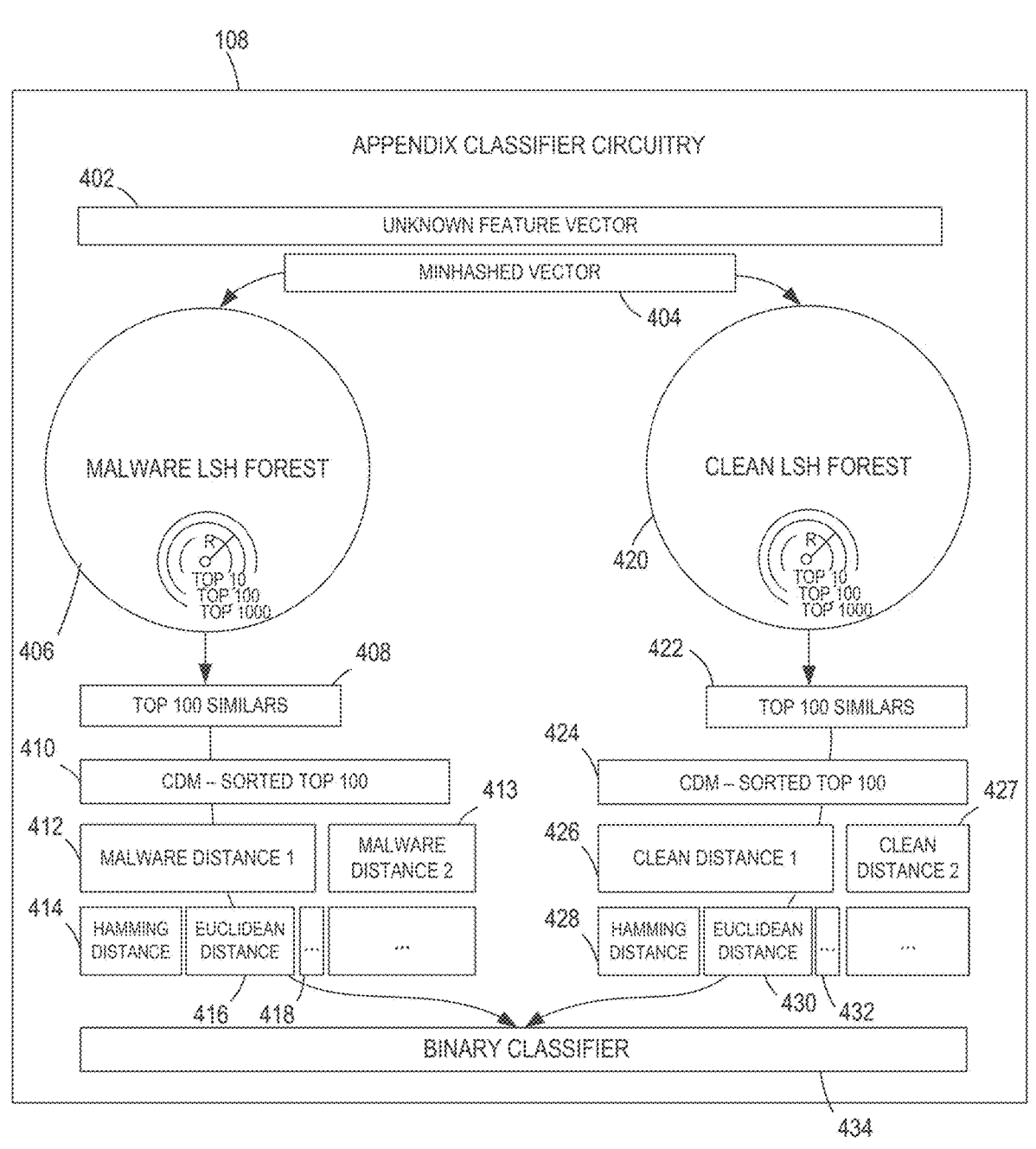
FIG. 4 is a block diagram of an example implementation of the appendix classifier circuitry of FIG. 1.

FIG. 4 is a block diagram of an example implementation of the appendix classifier circuitry 108 of FIG. 1. The example appendix classifier circuitry 108 includes an unknown feature vector 402, a MinHashed vector 404, a malware LSH forest 406, a top 100 similar malware items 408, a sorted top 100 similar sorted malware items 410, a first malware distance 412, a second malware distance 413, malware hamming distances 414, malware Euclidean distances 416, malware token set ratio distances 418, a clean LSH forest 420, a top 100 similar clean items 422, a sorted top 100 similar sorted clean items 424, a first clean distance 426, a second clean distance 427, clean hamming distances 428, clean Euclidean distances 430, clean token set ratio distances 432, and a binary classifier 434.

The example appendix classifier circuitry 108 implements two stages. The first stage re-uses a part of the unknown feature vector 402 defined by the traditional classifier. Only the features that are of categorical nature or features that can be transformed from numerical to categorical values are used by the first stage of the example appendix classifier circuitry 108. This first stage includes obtaining a MinHash (that is, a hash that maximizes collision) from the selected/hashable features of a given unclassified sample 102. This MinHashed vector 404 is then used to query two LSH (Locality Sensitive Hashing) Forests. One of these forests (e.g., malware LSH forest 406) includes samples of one class (e.g., malware) while the other forest (e.g., clean LSH forest 420) includes samples of the other class (e.g., clean). If the problem is multi-class, more forests would be needed to hold all the possible classes.

By querying these two forests with the test sample Min-Hash, a top-k list of similar malware items 408 and similar clean items 422 is obtained from each forest. 'k' is an adjustable value used to obtain more or less similar samples. In the example appendix classifier circuitry 108 of FIG. 2, k=100. In other examples, k may be a different value. Since the LSH Forest results are based on a radius search, the returned similar samples are approximately similar based on the Jaccard similarity. However, this is not a guarantee of order, so these similar samples are unsorted.

A Custom Distance Metric (CDM) is used to order the top 100 similar sorted malware items 410 and the top 100 similar sorted clean items 424. The CDM is used to compute several sub-distances (the number of sub-distances depends on how many different datatypes the original feature vector has). For example, if the feature vector includes three types of data (categorical features, numerical features, and string features) then the CDM would need to compute three sub-distances (e.g., malware hamming distances 414, clean hamming distances 428, malware Euclidean distances 416, clean Euclidean distances 430, malware token set ratio distances 418, and clean token set ratio distances 432). The computation of these sub-distances needs to be performed between the test sample and the k similar samples obtained from each forest. In this example, that would be 3 sub-distances×200 similar samples (100 from each forest). Computing the CDM ensures that new results can be sorted. That means, the 100 similar malware items 408 and similar clean items 422 returned by each forest can be sorted from closest to farthest. This order is important as it conveys additional signal that can be exploited by the example appendix classifier circuitry 108.

The example binary classifier 434 accepts a basic proximity vector 500A and/or an advanced proximity vector 500B from the first malware distance 412 and a second proximity vector 500A, 500B from the first clean distance 426 as input and produces a sample that is classified as either clean or malicious. The contents of a proximity vector 500A, 500B are further explored in conjunction with FIG. 5.

The example binary classifier 434 has been trained to learn the exact sub-distances values required to predict a sample as being malicious or clean based on the proximity with 100 similar malware items 408 and 100 similar clean items 422. In some examples, the 100 similar malware items 408 and 100 similar clean items 422 are referred to as "the neighborhood reputation". By comparison with known "clustering" methods, the example appendix classifier circuitry 108 does not require manual intervention to set and tune either number of clusters or operational parameters of the clusters (i.e., cluster centroid threshold adjustment to consider something as belonging or not). Even though the example appendix classifier circuitry 108 is based on distances to labels, it still behaves like any other decision-based or linear-based classifier, which does not require unsupervised learning maintenance and tweaks for the classification task. This is an advantage of the example appendix classifier circuitry 108.

FIG. 5A depicts an example data set that may be implemented by the appendix classifier circuitry 108 of FIG. 1 to create a basic proximity vector 500A The example basic proximity vector 500A classifies neighborhood samples with a binary classifier (i.e., 1 is malicious, 0 is clean). The basic proximity vector 500A includes a top 1 similar basic sample 502A, a top 2 similar basic sample 504A, a top 3 similar basic sample 506A, and so on until the top kth similar sample, classified as malicious, malicious, and clean, respectively.

FIG. 5B is an example data set that may be implemented by the appendix classifier circuitry 108 of FIG. 1 to create a proximity vector 500B (e.g., advanced proximity vector 500B). While the example data set shows an example using malicious samples, the example proximity vector 500B is formatted in the same manner for both clean and malicious samples. The example proximity vector 500B includes a top 1 similar advanced sample 502B, a top 2 similar advanced sample 504B, top 3 similar advanced sample 506B, and so on until the top kth similar sample. The top 1 similar advanced sample 502B includes a first hamming distance 514A, a first Euclidean distance 516A, and first Token Set Ratio (TSR) distance 518A. The top 2 similar advanced sample 504B includes a second hamming distance 514B, a second Euclidean distance 516B, and a second TSR distance 518B. The top 3 similar advanced sample 506B includes a third hamming distance 514C, a third Euclidean distance 516C, and a third TSR distance 518C.

When the example appendix classifier circuitry 108 of FIGS. 1 and/or 4 sorts the top 100 similar sorted malware items 410 and the top 100 similar sorted clean items 424, the sorted lists are saved as proximity vectors 500A, 500B. The samples received by the appendix classifier circuitry 108 are sorted by malware hamming distances 414 first, by malware Euclidean distances 416 second, and by malware token set ratio distances 418. The proximity vectors 500A, 500B are used by the binary classifier 434 to classify the unclassified samples 102 as clean or malicious.

In some examples, the malware classifier circuitry 104 of FIG. 1 includes means for determining a final classification result for an unknown data sample, based on a confidence threshold associated with a feature-based classifier and an appendix classifier. For example, the means for determining a final classification result for an unknown data sample, based on a confidence threshold associated with a feature-based classifier and an appendix classifier may be implemented by sample classification circuitry 110. In some examples, the sample classification circuitry 110 may be implemented by machine executable instructions such as that implemented by at least blocks 608-612 of FIG. 6 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the sample classification circuitry 110 is implemented by other hardware logic circuitry, hardware implemented state machines, and/or any other combination of hardware, software, and/or firmware. For example, the sample classification circuitry 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the malware classifier circuitry 104 is illustrated in FIG. 1, one or more of the elements, processes, and/or devices illustrated in FIG. 1 may be combined, divided, re-arranged, omitted, eliminated, and/or implemented in any other way. Further, the example feature-based classifier circuitry 106, the example appendix classifier circuitry 108, the example sample classification circuitry 110, and/or, more generally, the example malware classifier circuitry 104 of FIG. 1, may be implemented by hardware, software, firmware, and/or any combination of hardware, software, and/or firmware. Thus, for example, any of the example feature-based classifier circuitry 106, the example appendix classifier circuitry 108, the example sample classification circuitry 110, and/or, more generally, the example malware classifier circuitry 104 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example feature-based classifier circuitry 106, the example appendix classifier circuitry 108, and/or the example sample classification circuitry 110 is/are hereby expressly defined to include a non-transitory computer readable storage device or storage disk such as a memory, a digital versatile disk (DVD), a compact disk (CD), a Blu-ray disk, etc., including the software and/or firmware. Further still, the example malware classifier circuitry 104 of FIG. 1 may include one or more elements, processes, and/or devices in addition to, or instead of, those illustrated in FIG. 1, and/or may include more than one of any or all of the illustrated elements, processes and devices.

A flowchart representative of example hardware logic circuitry, machine readable instructions, hardware implemented state machines, and/or any combination thereof for implementing the malware classifier circuitry 104 of FIG. 1 is shown in FIG. 6. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example malware classifier circuitry 104 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 7:
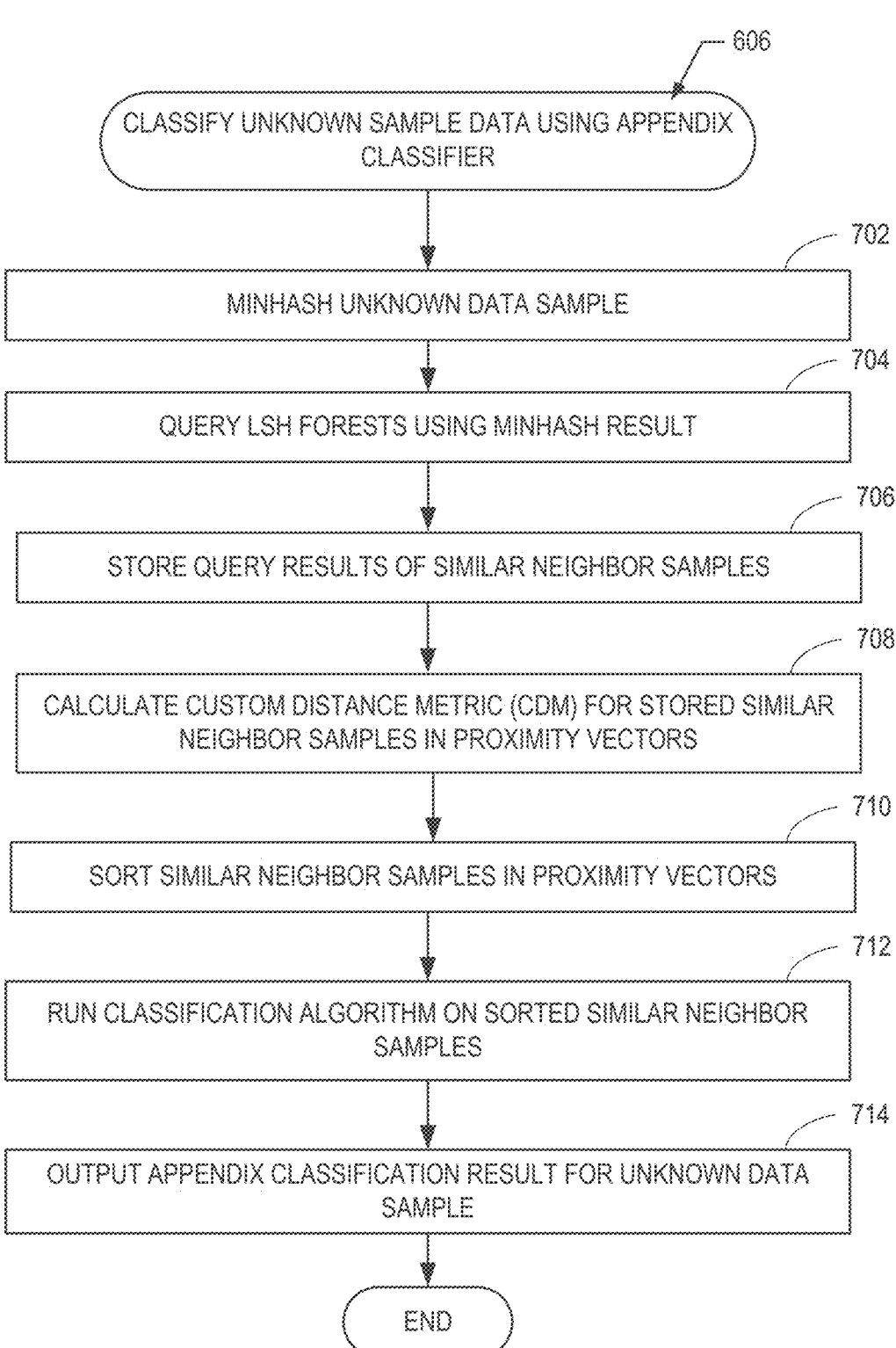

A flowchart representative of example hardware logic circuitry, machine readable instructions, hardware implemented state machines, and/or any combination thereof for implementing the malware classifier circuitry 104 of FIG. 1 is shown in FIG. 7. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example malware classifier circuitry 104 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to receive, classify, and out the classification result of an unknown data sample. The machine readable instructions and/or operations 600 of FIG. 6 begin at block 602, at which the malware classifier circuitry 104 of FIG. 1 accesses an unclassified sample for classification.

At block 604, the feature-based classifier circuitry 106 of FIG. 1 classifies the unknown data sample using a feature-based classifier. In examples disclosed herein, the feature-based classifier may be a decision tree-based classifier that produces an output indicating whether the inputted unknown data sample is clean or malicious.

At block 606, the appendix classifier circuitry 108 of FIG. 1 classifies the unknown data sample using an appendix classifier. Classification of the unknown data sample using an appendix classifier is described further in conjunction with FIG. 7.

At block 608, the sample classification circuitry 110 of FIG. 1 determines whether the feature-based classification result of block 604 falls above a pre-determined confidence threshold. In examples disclosed herein, the pre-determined confidence threshold is designed to compare the determined accuracy of the feature-based classification result against a minimum passable confidence threshold for classification.

At block 610, if the sample classification circuitry 110 of FIG. 1 determines that the feature-based classification result of block 604 does pass the pre-determined confidence threshold, the feature-based classification result of block 604 is output.

At block 612, if the sample classification circuitry 110 of FIG. 1 determines that the feature-based classification result of block 604 does not pass the pre-determined confidence threshold, the appendix classification result of block 606 is output.

FIG. 7 is a flowchart representative of machine readable instructions which may be executed by the example appendix classifier circuitry 108 of FIG. 1 to implement block 606 of FIG. 6 to classify the unknown data sample using an appendix classifier.

As illustrated in FIG. 7, at block 702, a MinHash is performed on the received unknown data sample by the appendix classifier circuitry 108. In examples disclosed herein, MinHash refers to a type of hashing algorithm wherein the goal is to maximize collision between data samples to find similarities, unlike a traditional cryptographic hashing algorithm.

At block 704, the resulting MinHash table is used by the appendix classifier circuitry 108 to query both the clean LSH forest 420 and malicious LSH forest 406 of FIG. 4 and return a set of both malicious and clean similar neighbor samples from the clean LSH forest 420 and malicious LSH forest 406.

At block 706, the results of the query are stored (e.g., in an array) by the appendix classifier circuitry 108 as top 100 similar malware items and top 100 similar clean items (e.g., malware LSH forest 406, clean LSH forest 420 of FIG. 4) for further processing.

At block 708, the custom distance metric (CDM) is calculated by the appendix classifier circuitry 108 for the similar neighbor samples results stored from the query run in block 706. In examples disclosed herein, the CDM is used to compute several sub-distances (the number of sub-distances depends on how many different datatypes the original feature vector has). For example, if the feature vector includes three types of data (categorical features, numerical features, and string features) then the appendix classifier circuitry 108 would need to compute three sub-distances (e.g., malware hamming distances 414, clean hamming distances 428, malware Euclidean distances 416, clean Euclidean distances 430, malware token set ratio distances 418, and clean token set ratio distances 432 of FIG. 4). The computation of these sub-distances needs to be performed between the test sample and the k similar samples obtained from each forest. In this example, that would be 3 sub-distances×200 similar samples (100 from each forest).

At block 710, the top 100 similar malware items and top 100 similar clean items (e.g., malware LSH forest 406, clean LSH forest 420 of FIG. 4) are sorted by the appendix classifier circuitry 108. In examples disclosed herein, the respective proximity vectors are sorted from closest to furthest samples, however, in other examples, the proximity vectors may be sorted from furthest to closest, etc.

At block 712, a classification algorithm is run by the appendix classifier circuitry 108 on the sorted similar neighbor samples to classify the unknown data sample as either malicious or clean. In examples disclosed herein, the classification algorithm utilized include at least one of a linear regression algorithm or logistic regression algorithm, however, any other type of classification algorithm may be performed on the sorted similar neighbor samples.

At block 714, the appendix classification result for the unknown data sample (e.g., malicious sample or clean sample), as determined in block 712, is output by the appendix classifier circuitry 108.

Figure 8:
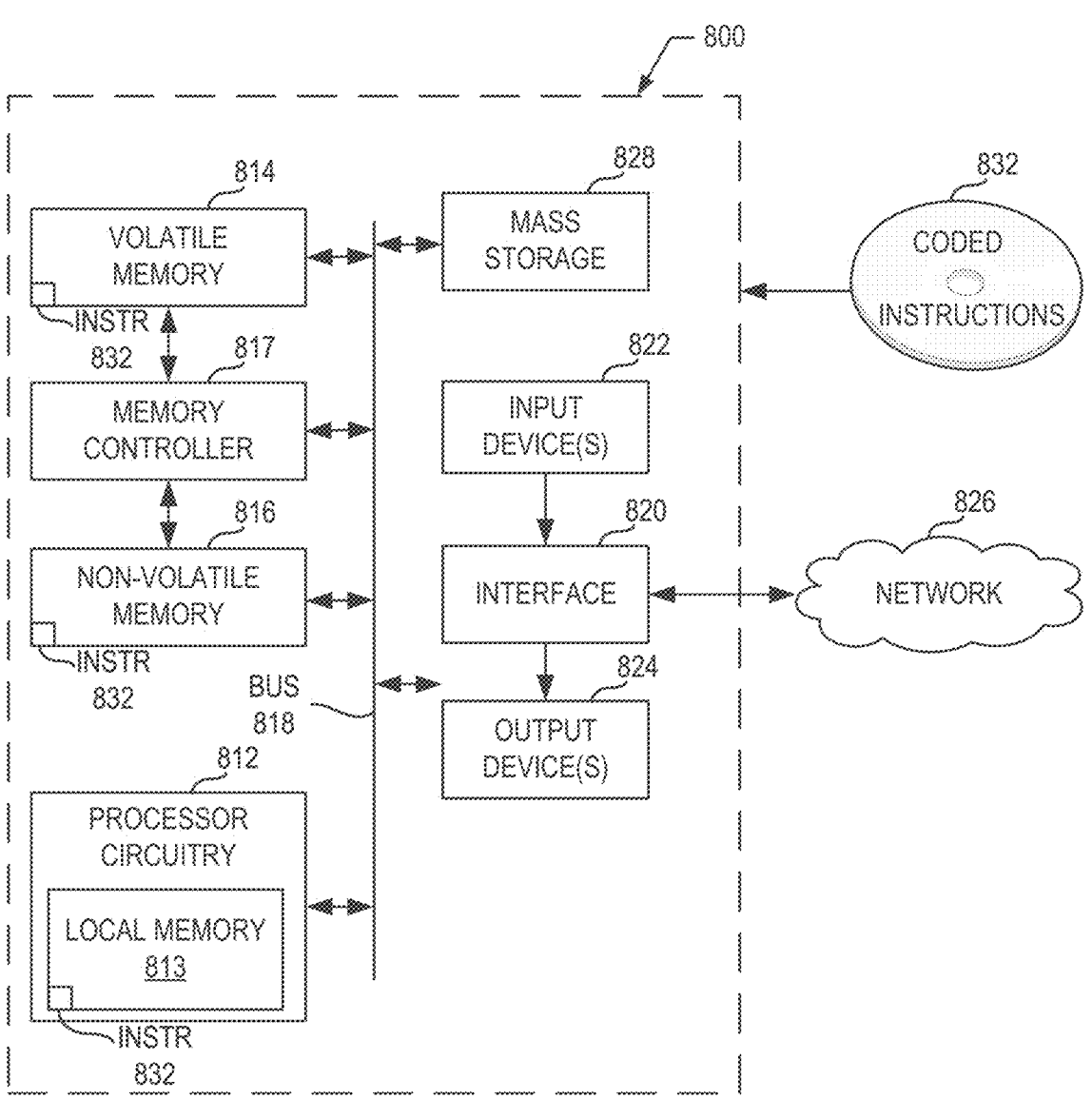
FIG. 8 is a block diagram of an example processing platform including processor circuitry structured to execute the example machine readable instructions of FIGS. 6-7 to implement the malware classifier circuitry 104 of FIG. 1.

FIG. 8 is a block diagram of an example processor platform 800 structured to execute and/or instantiate the machine readable instructions and/or operations of FIGS. 6-7 to implement the malware system 100 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example feature-based classifier circuitry 106, appendix classifier circuitry 108, and sample classification circuitry 110.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 840 are connected to the interface circuitry 820. The input device(s) 822 permit(s) a user to enter data and/or commands into the processor circuitry 8812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 6-7, may be stored in the mass storage device 828, in the volatile memory 84, in the non-volatile memory 816, and/or on a removable non-transitory computer readable storage medium such as a CD or DVD.

Figure 9:
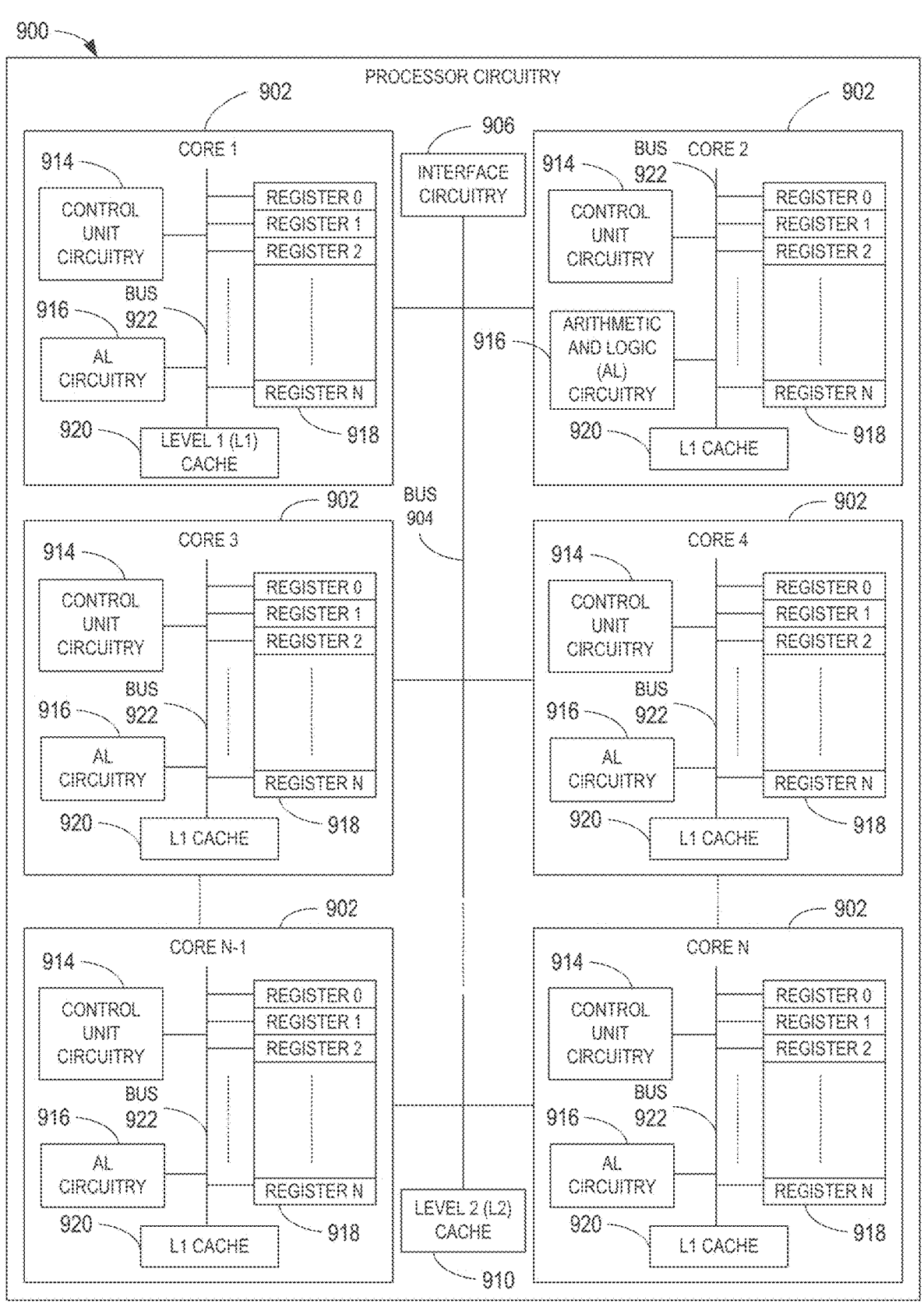
FIG. 9 is a block diagram of an example implementation of the processor circuitry of FIG. 8.

FIG. 9 is a block diagram of an example implementation of the processor circuitry 825 of FIG. 8. In this example, the processor circuitry 825 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIGS. 6-7.

The cores 902 may communicate by an example first bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 815, 820 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
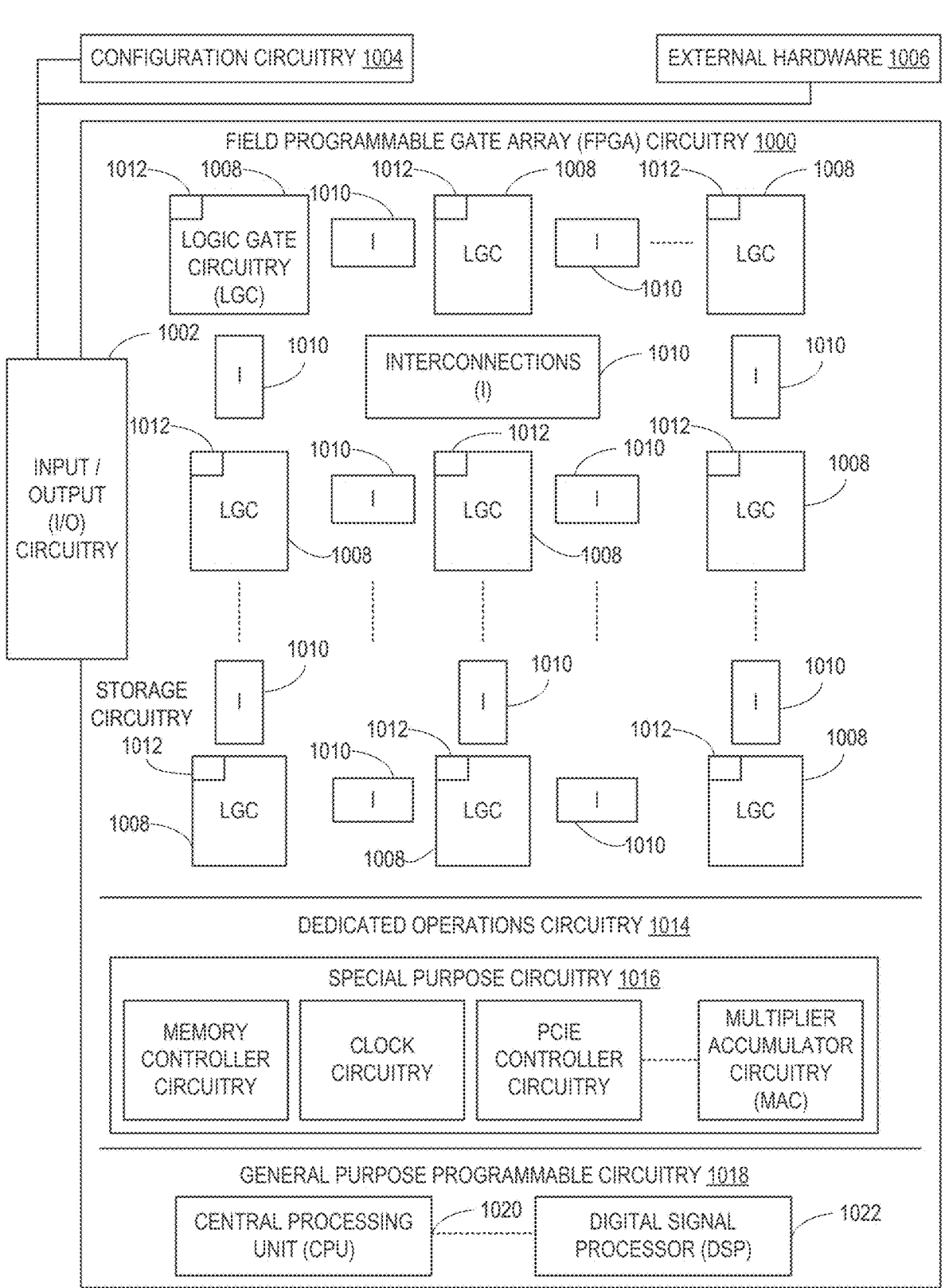
FIG. 10 is a block diagram of another example implementation of the processor circuitry of FIG. 8.

FIG. 10 is a block diagram of another example implementation of the processor circuitry 825 of FIG. 8. In this example, the processor circuitry 825 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 6-7 In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6-7. As such, the FPGA circuitry 1000 may be structured to effectively instantiate some or all of the machine readable instructions of the flowcharts of FIGS. 6-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 6-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 6-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 825 of FIG. 8, many other approaches are contemplated. For example, as mentioned above, modern FPGA circuitry may include an onboard CPU, such as one or more of the example CPU 1020 of FIG. 10. Therefore, the processor circuitry 825 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6-7 may be executed by one or more of the cores 902 of FIG. 9 and a second portion of the machine readable instructions represented by the flowcharts of FIGS. 6-7 may be executed by the FPGA circuitry 1000 of FIG. 10.

In some examples, the processor circuitry 825 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 825 of FIG. 8, which may be in one or more packages. For example, the XPU may include a CPU in one package, a DSP in another package, a GPU in yet another package, and an FPGA in still yet another package.

Figure 11:
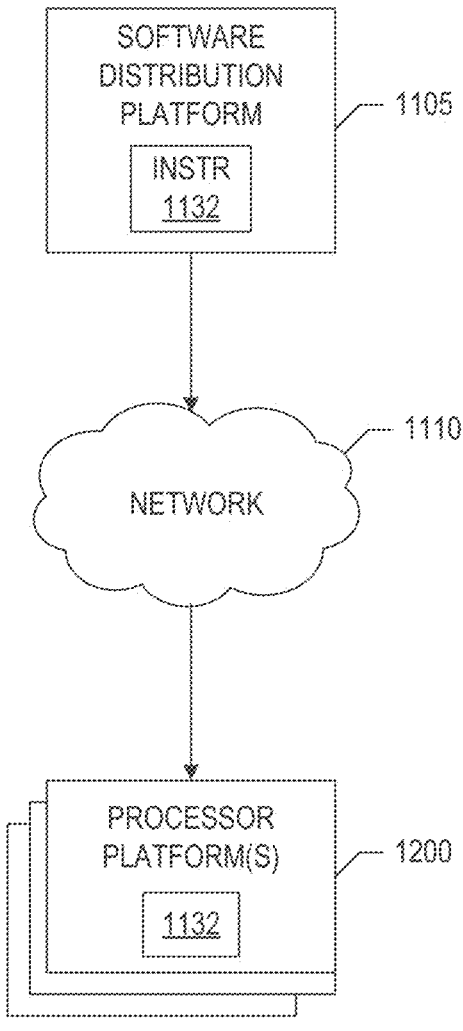
FIG. 11 is a block diagram of an example software distribution platform (e.g., one or more servers) to distribute software (e.g., software corresponding to the example machine readable instructions of FIGS. 6 and 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 1132 of FIG. 11 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions represented by the flowcharts of FIGS. 6-7. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 1132, which may correspond to the example machine readable instructions represented by the flowcharts of FIGS. 6-7, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1105. For example, the software, which may correspond to the example machine readable instructions represented by the flowcharts of FIGS. 6-7 may be downloaded to the example processor platform 1100, which is to execute the machine readable instructions 1132 to implement the malware classification system 100 of FIG. 1. In some example, one or more servers of the software distribution platform 1105 periodically offer, transmit, and/or force updates to the software (e.g., the example machine readable instructions 1132 of FIG. 11) to ensure improvements, patches, updates, etc., are distributed and applied to the software at the end user devices.

Example methods, apparatus, systems, and articles of manufacture to augment classification coverage for low prevalence samples through neighborhood labels proximity vectors are disclosed herein. Further examples and combinations thereof include the following:

Example 1 includes an apparatus to augment classification coverage for low prevalence malware samples comprising interface circuitry, processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations or the third operations to instantiate feature-based classifier circuitry to calculate a first classification result using a first classifier for a data sample, appendix classifier circuitry to calculate a second classification result using a second classifier for a data sample, the second classifier using a plurality of sensitive hashing (LSH) forests to analyze a sorted plurality of neighbor samples, and sample classification circuitry to determine whether a first classification result of the first classifier passes a confidence threshold, wherein the appendix classifier circuitry is to output the first classification result when the first classification result of the first classifier is determined to have passed the confidence threshold, and the appendix classifier circuitry is to output the second classification result when the first classification result of the first classifier is determined to have not passed the confidence threshold.

Example 2 includes the apparatus of example 1, wherein the first classifier is a feature-based classifier.

Example 3 includes the apparatus of example 1, wherein the appendix classifier circuitry is to perform a hashing algorithm on the data sample, query a clean locality sensitive hashing (LSH) forest and a malicious LSH forest for a plurality of similar neighbor samples, calculate a custom distance metric (CDM) for a first stored similar neighbor sample of the plurality of similar neighbor samples, sort the plurality of similar neighbor samples based on the calculated CDM for first stored similar neighbor sample, execute a classification algorithm on the sorted plurality of neighbor samples to produce an appendix classification result, and output the appendix classification result.

Example 4 includes the apparatus of example 3, wherein the hashing algorithm is a MinHash algorithm.

Example 5 includes the apparatus of example 3, wherein the custom distance metric (CDM) is used to compute a plurality of sub-distances including at least two of a Hamming distance, a Euclidean distance, and a Token Set Ratio distance.

Example 6 includes the apparatus of example 3, wherein the classification algorithm is executed on the sorted plurality of neighbor samples to produce the appendix classification result is at least one of a linear regression algorithm or a logistic regression algorithm.

Example 7 includes a non-transitory computer readable medium comprising a plurality of instructions that, when executed, cause a machine to at least classify a data sample using a first classifier, classify the data sample using a second classifier different from the first classifier, the second classifier using a plurality of sensitive hashing (LSH) forests to analyze a sorted plurality of neighbor samples, determine whether a first classification result of the first classifier meets or exceeds a confidence threshold, in response to the first classification result of the first classifier meeting or exceeding the confidence threshold, output the first classification result, and in response to the first classification result of the first classifier not meeting or exceeding the confidence threshold, output a second classification result of the second classifier.

Example 8 includes the non-transitory computer readable medium of example 7, wherein the first classifier is a feature-based classifier.

Example 9 includes the non-transitory computer readable medium of example 7, wherein the first classifier is a decision tree-based classifier.

Example 10 includes the non-transitory computer readable medium of example 7, wherein to calculate the second classification result, the plurality of instructions further cause the machine to at least perform a hashing algorithm on the data sample, query a clean locality sensitive hashing (LSH) forest and a malicious LSH forest for a plurality of similar neighbor samples, calculate a custom distance metric (CDM) for a first stored similar neighbor sample of the plurality of similar neighbor samples, sort the plurality of similar neighbor samples based on the calculated CDM for first stored similar neighbor sample, execute a classification algorithm on the sorted plurality of neighbor samples to produce an appendix classification result, and output the appendix classification result.

Example 11 includes the non-transitory computer readable medium of example 10, wherein the hashing algorithm is a MinHash algorithm.

Example 12 includes the non-transitory computer readable medium of example 10, wherein the custom distance metric (CDM) is used to compute a plurality of sub-distances such as a Hamming distance, a Euclidean distance, and a Token Set Ratio distance.

Example 13 includes the non-transitory computer readable medium of example 10, wherein the classification algorithm run on the sorted plurality of neighbor samples to produce the appendix classification result is a linear regression algorithm or a logistic regression algorithm.

Example 14 includes the non-transitory computer readable medium of example 7, wherein the confidence threshold is a pre-determined confidence threshold.

Example 15 includes a method to augment classification coverage for low prevalence malware samples comprising classifying an unknown data sample using a first classifier, classifying the unknown data sample using a second classifier, the second classifier using a plurality of sensitive hashing (LSH) forests to analyze a sorted plurality of neighbor samples, determining whether a first classification result of the first classifier passes a confidence threshold, outputting, when the first classification result of the first classifier is determined to have passed the confidence threshold, the first classification result, and outputting, when the first classification result of the first classifier is determined to have not passed the confidence threshold, a second classification result of the second classifier.

Example 16 includes the method of example 15, wherein the first classifier is a feature-based classifier.

Example 17 includes the method of example 16, wherein the first classifier is a decision tree-based classifier.

Example 18 includes the method of example 15, where the second classification result is calculated by performing a hashing algorithm on the data sample, querying a clean locality sensitive hashing (LSH) forest and a malicious LSH forest for a plurality of similar neighbor samples, calculating a custom distance metric (CDM) for a first stored similar neighbor sample of the plurality of similar neighbor samples, sorting the plurality of similar neighbor samples based on the calculated CDM for first stored similar neighbor sample, executing a classification algorithm on the sorted plurality of neighbor samples to produce an appendix classification result, and outputting the appendix classification result.

Example 19 includes the method of example 18, wherein the hashing algorithm is a MinHash algorithm.

Example 20 includes the method of example 18, wherein the custom distance metric (CDM) is used to compute a plurality of sub-distances including at least two of a Hamming distance, a Euclidean distance, and a Token Set Ratio distance.

Example 21 includes the method of example 18, wherein the classification algorithm run on the sorted plurality of neighbor samples to produce the appendix classification result is at least one of a linear regression algorithm or a logistic regression algorithm.

Example 22 includes the method of example 15, wherein the confidence threshold is a pre-determined confidence threshold.

Example 23 includes an apparatus for augmentation of classification coverage for low prevalence samples comprising means for classifying to classify an unknown data sample using a first classifier, the means for classifying to classify the unknown data sample using a second classifier, the second classifier using a plurality of sensitive hashing (LSH) forests to analyze a sorted plurality of neighbor samples, means for determining whether a first classification result of the first classifier passes a confidence threshold, and means for outputting the first classification result when the first classification result of the first classifier is determined to have passed the confidence threshold, the means for outputting to output a second classification result of the second classifier when the first classification result of the first classifier is determined to have not passed the confidence threshold.

Example 24 includes the apparatus of example 23, wherein the first classifier is a feature-based classifier.

Example 25 includes the apparatus of example 24, wherein the first classifier is a decision tree-based classifier.

Example 26 includes the apparatus of example 23, wherein the means for classifying is further to perform a hashing algorithm on the data sample, query a clean locality sensitive hashing (LSH) forest and a malicious LSH forest for a plurality of similar neighbor samples, calculate a custom distance metric (CDM) for a first stored similar neighbor sample of the plurality of similar neighbor samples, sort the plurality of similar neighbor samples based on the calculated CDM for first stored similar neighbor sample, execute a classification algorithm on the sorted plurality of neighbor samples to produce an appendix classification result, and output the appendix classification result.

Example 27 includes the apparatus of example 26, wherein the hashing algorithm is a MinHash algorithm.

Example 28 includes the apparatus of example 26, wherein the means for classifying is further to compute a plurality of sub-distances including at least two of a Hamming distance, a Euclidean distance, and a Token Set Ratio distance.

Example 29 includes the apparatus of example 26, wherein the means for classifying is to produce the appendix classification result based on at least one of a linear regression algorithm or a logistic regression algorithm.

Example 30 includes the apparatus of example 23, wherein the confidence threshold is a pre-determined confidence threshold.

It is noted that this patent claims priority from U.S. Provisional Patent Application No. 63/227,305, which was filed on Jul. 29, 2021, and is hereby incorporated by reference in its entirety.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
interface circuitry;
machine-readable instructions; and
at least one processor circuit to be programmed by the machine-readable instructions to:
obtain malicious neighbor samples based on a non-classified sample;
obtain clean neighbor samples based on the non-classified sample;
generate a malicious proximity vector representing first distances between the non-classified sample and a first malicious neighbor sample from the malicious neighbor samples;
generate a clean proximity vector representing second distances between the non-classified sample and a first clean neighbor sample from the clean neighbor samples; and
classify the non-classified sample as a clean sample or a malicious sample based on at least one of the malicious proximity vector or the clean proximity vector.

2. The apparatus of claim 1, wherein the non-classified sample corresponds to a file that is not classified as malicious or clean.

3. The apparatus of claim 1, wherein the first distances include at least one of a hamming distance, a Euclidean distance, or a token set ratio distance.

4. The apparatus of claim 1, wherein one or more of the at least one processor circuit is to:
sort the first distances in the malicious proximity vector based on a first one of the first distances first and a second one of the first distances second; and
sort the second distances in the clean proximity vector based on a first one of the second distances first and a second one of the second distances second.

5. The apparatus of claim 1, wherein one or more of the at least one processor circuit is to:
generate a hash table based on the non-classified sample;
obtain the malicious neighbor samples from a malicious locality sensitive hashing (LSH) forest based on the hash table; and
obtain the clean neighbor samples from a clean LSH forest based on the hash table.

6. The apparatus of claim 1, wherein one or more of the at least one processor circuit is to output a classification of the non-classified sample as the clean sample or the malicious sample after a determination that a feature-based classification of the non-classified sample does not satisfy a threshold.

7. The apparatus of claim 1, wherein a quantity of the first distances is based on a quantity of datatypes in the at least one of the malicious neighbor samples or the clean neighbor samples, a quantity of the second distances is based on the quantity of the datatypes.

8. At least one non-transitory machine-readable medium comprising machine-readable instructions to cause at least one processor circuit to at least:

request malicious neighbor samples based on a non-classified sample;

request clean neighbor samples based on the non-classified sample;

cause storing of a malicious proximity vector, the malicious proximity vector representing first distances between the non-classified sample and a first malicious neighbor sample from the malicious neighbor samples;

cause storing of a clean proximity vector, the clean proximity vector representing second distances between the non-classified sample and a first clean neighbor sample from the clean neighbor samples; and classify the non-classified sample as clean or malicious based on at least one of the malicious proximity vector or the clean proximity vector.

9. The at least one non-transitory machine-readable medium of claim 8, wherein the non-classified sample corresponds to a file.

10. The at least one non-transitory machine-readable medium of claim 8, wherein the first distances include at least one of a hamming distance, a Euclidean distance, or a token set ratio distance.

11. The at least one non-transitory machine-readable medium of claim 8, wherein the machine-readable instructions are to cause one or more of the at least one processor circuit to:

sort the first distances in the malicious proximity vector based on a first one of the first distances first and a second one of the first distances second; and sort the second distances in the clean proximity vector based on a first one of the second distances first and a second one of the second distances second.

12. The at least one non-transitory machine-readable medium of claim 8, wherein the machine-readable instructions are to cause one or more of the at least one processor circuit to:

generate a hash table based on the non-classified sample;

request the malicious neighbor samples from a malicious locality sensitive hashing (LSH) forest based on the hash table; and request the clean neighbor samples from a clean LSH forest based on the hash table.

13. The at least one non-transitory machine-readable medium of claim 8, wherein the machine-readable instructions are to cause one or more of the at least one processor circuit to output a malicious classification or a clean classification of the non-classified sample based on the at least one of the malicious proximity vector or the clean proximity vector after a determination that a feature-based classification of the non-classified sample does not satisfy a threshold.

14. The at least one non-transitory machine-readable medium of claim 8, wherein a quantity of the first distances is based on a quantity of datatypes in the malicious neighbor samples and the clean neighbor samples, a quantity of the second distances is based on the quantity of the datatypes.

15. A method comprising:

identifying malicious neighbor samples based on a non-classified sample;

identifying clean neighbor samples based on the non-classified sample;

generating, by at least one processor circuit programmed by at least one instruction, a malicious proximity vector that includes first distance values, the first distance values representing first distances between the non-classified sample and a first malicious neighbor sample from the malicious neighbor samples;

generating, by one or more of the at least one processor circuit, a clean proximity vector that includes second distance values, the second distance values representing second distances between the non-classified sample and a first clean neighbor sample from the clean neighbor samples; and generating, by one or more of the at least one processor circuit, a classification of the non-classified sample as a clean sample or a malicious sample based on at least one of the malicious proximity vector or the clean proximity vector.

16. The method of claim 15, wherein the non-classified sample corresponds to a file that is not classified as malicious or clean.

17. The method of claim 15, wherein the first distances include at least one of a hamming distance, a Euclidean distance, or a token set ratio distance.

18. The method of claim 15, including:

sorting the first distance values in the malicious proximity vector based on a first one of the first distances first and a second one of the first distances second; and sorting the second distance values in the clean proximity vector based on a first one of the second distances first and a second one of the second distances second.

19. The method of claim 15, including generating a hash table based on the non-classified sample, the identifying of the malicious neighbor samples is from a malicious locality sensitive hashing (LSH) forest based on the hash table, the identifying of the clean neighbor samples is from a clean LSH forest based on the hash table.

20. The method of claim 15, including outputting the classification of the non-classified sample as the clean sample or the malicious sample after a determination that a feature-based classification of the non-classified sample does not satisfy a threshold.

* * * * *